United States Patent

[11] 3,625,599

| [72] | Inventor | Alfred G. Poirier |
| | | P.O. Box 19, Saratoga Springs, N.Y. 12866 |
| [21] | Appl. No. | 78,418 |
| [22] | Filed | Oct. 6, 1970 |
| [45] | Patented | Dec. 7, 1971 |

[54] COMBINED MIRROR AND VISOR
4 Claims, 14 Drawing Figs.

[52] U.S. Cl. ........................................................ 350/307,
74/491, 296/97 G
[51] Int. Cl. .......................................................... G02b 5/08
[50] Field of Search............................................ 296/97 G,
97; 350/307; 74/501 M, 491

[56] References Cited
UNITED STATES PATENTS

| 1,927,137 | 9/1933 | Soukup ....................... | 296/97 G |
| 2,346,739 | 4/1944 | Ewing .......................... | 350/307 |

FOREIGN PATENTS

| 546,552 | 8/1942 | Great Britain................ | 350/307 |

Primary Examiner—David Schonberg
Assistant Examiner—John W. Leonard
Attorney—Settle and Oltman ABSTRACT: A mirror is mounted above the roof of a vehicle at an aperture, the mirror being adjustable horizontally and vertically by operation of concentric shafts passing through the roof. A visor is provided which cannot block the aperture, the visor including blades which fan out to block or shade the sun at the top of the windshield of the vehicle.

PATENTED DEC 7 1971

INVENTOR.
ALFRED G. POIRIER
BY
SETTLE & OLTMAN
ATTORNEYS

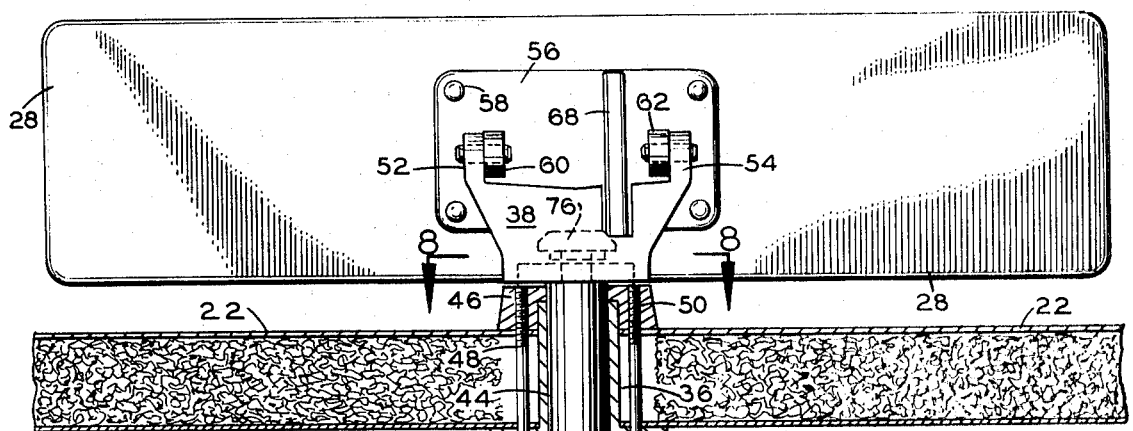
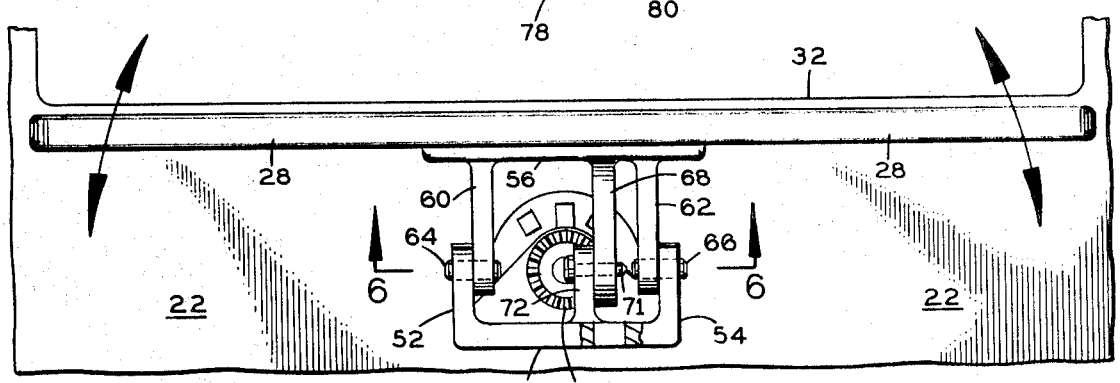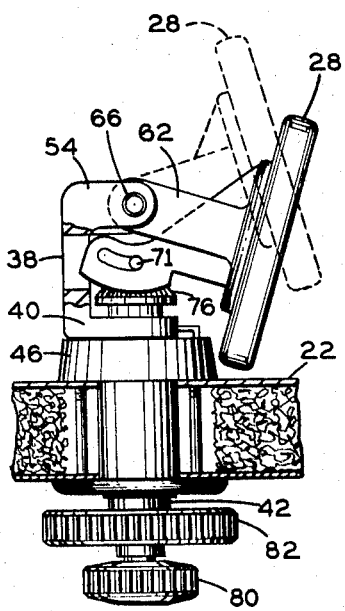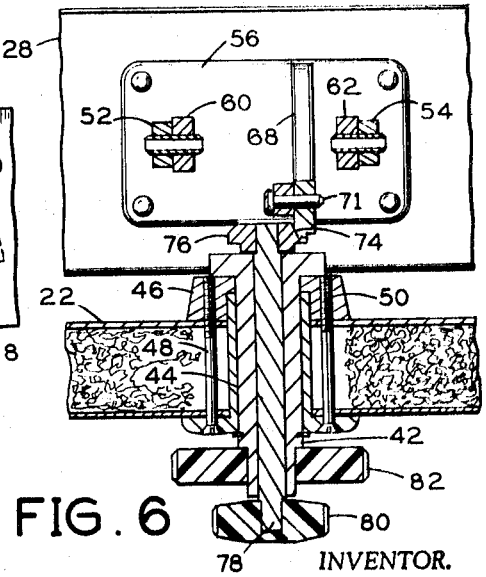

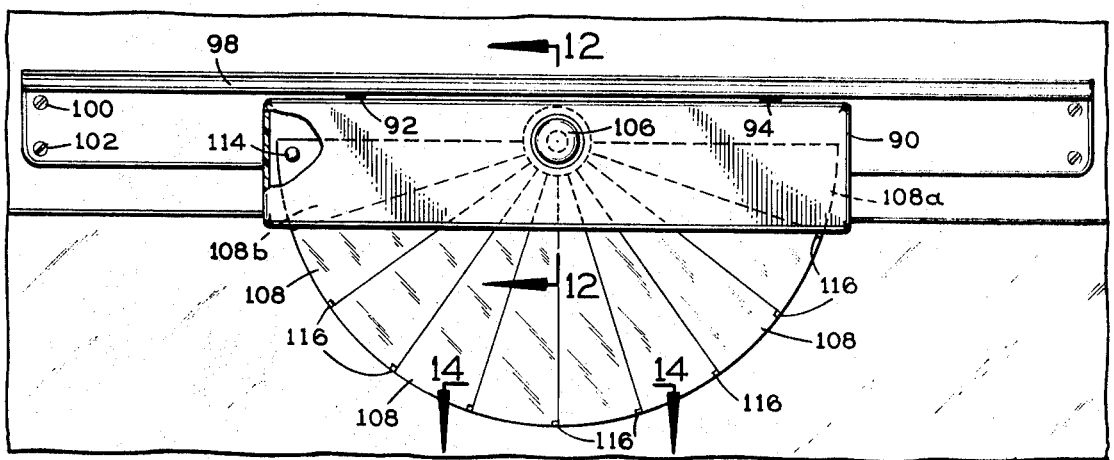
FIG. 9
FIG. 11
FIG. 10
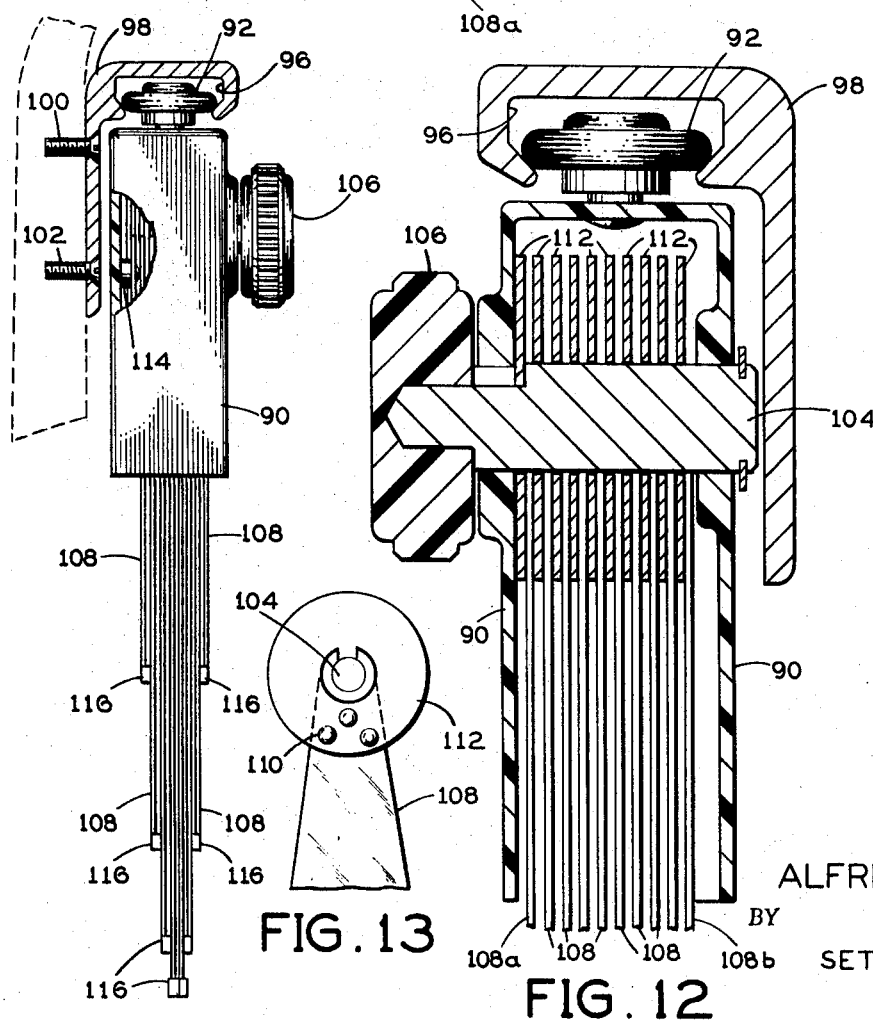
FIG. 13
FIG. 12
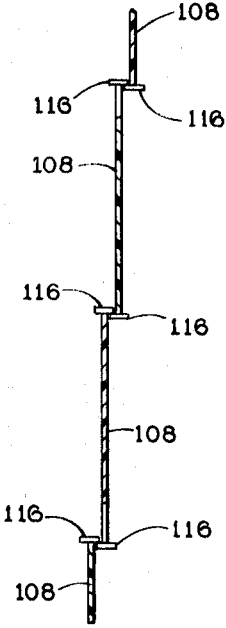
FIG. 14
INVENTOR.
ALFRED G. POIRIER
BY
SETTLE & OLTMAN
ATTORNEYS

COMBINED MIRROR AND VISOR

BACKGROUND OF THE INVENTION

There have been many proposals for improving the field of vision of rearview mirrors in automobiles and other vehicles. One approach involves the mounting of the rearview mirror above the roof of the vehicle at a window aperture in the roof to give a field of vision which is not limited by the rear window of the vehicle. Representative patents involving proposals of this type are: U.S. Pat. Nos. 2,121,815 and 3,468,601.

A difficulty with some of these proposals is that the sun visor which is normally provided at the top of the windshield may interfere with controls for adjusting the mirror, and could even partially block the window aperture through which the mirror is viewed. Controls for the adjustment of the mirror have also been somewhat awkward to use.

BRIEF SUMMARY OF THE INVENTION

The present invention comprises a combined rearview mirror and visor system which eliminates interference between visor and mirror and provides for convenient adjustment of the mirror. The mirror is pivotally mounted on a bracket above the roof at an aperture. The bracket may be turned horizontally for horizontal adjustment of the mirror by turning a first shaft which extends through the roof ahead of the aperture. The mirror may be turned vertically through gears by operation of a second shaft concentric with the first also extending through the roof. Just ahead of the lower ends of the shaft at the top of the windshield, a visor assembly is mounted including a plurality of blades which fan out to cover the upper portion of the windshield. The visor assembly may be mounted on a track to allow it to be adjusted laterally of the windshield.

Accordingly, it is an object of the present invention to provide a rearview mirror and visor system which will not interfere with each other.

Another object of the invention is to improve the adjustment controls for a rearview mirror mounted above the roof of a vehicle.

A further object of the invention is to provide a visor assembly which can be mounted at the top of the windshield of a vehicle next to controls extending downwardly from a rearview mirror without blocking access to the controls or the window aperture for the mirror.

Other objects of this invention will appear from the following description and appended claims, reference being had to the accompanying drawings forming a part of this specification wherein like reference characters designate corresponding parts in the several views.

BRIEF DESCRIPTION OF THE DRAWINGS

FIG. 4 is an enlarged view of the mirror, partly sectional, as view from the front of the vehicle;

FIG. 5 is a plan view of the mirror;

FIG. 6 is a sectional view taken along line 6—6 of FIG. 5 looking in the direction of the arrows;

FIG. 7 is a fragmentary view showing the mirror adjusted to different positions;

FIG. 8 is a fragmentary view showing the mirror adjusted horizontally to different positions;

FIG. 9 is a fragmentary view of the visor of the system in a spread out condition;

FIG. 10 is a fragmentary view of the visor in a retracted condition;

FIG. 11 is an end view of the visor;

FIG. 12 is a sectional view taken along line 12—12 of FIG. 1 looking in the direction of the arrows;

FIG. 13 is a fragmentary view of one blade of the visor; and

FIG. 14 is a fragmentary sectional view taken along line 14—14 of FIG. 1 looking in the direction of the arrows.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

AS SHOWN ON THE DRAWINGS

Figure 1:
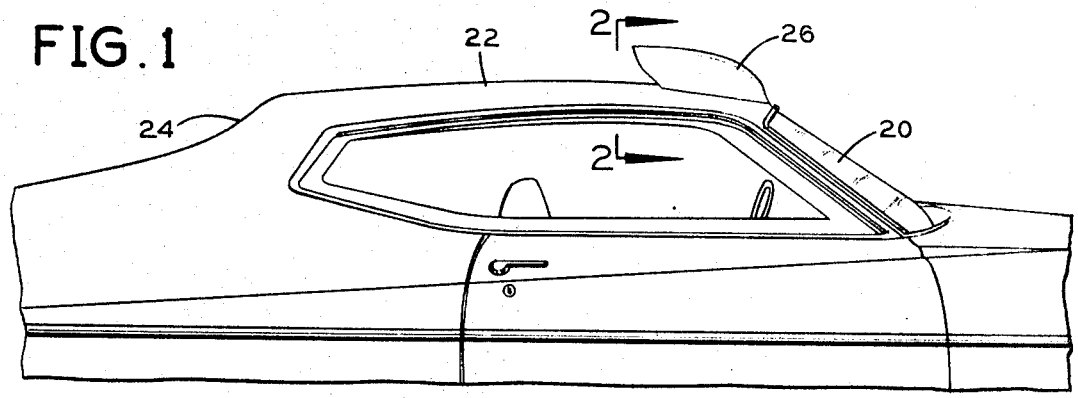
FIG. 1 is a fragmentary view of a vehicle body having a rearview mirror and visor in accordance with one embodiment of the invention.
Figure 2:
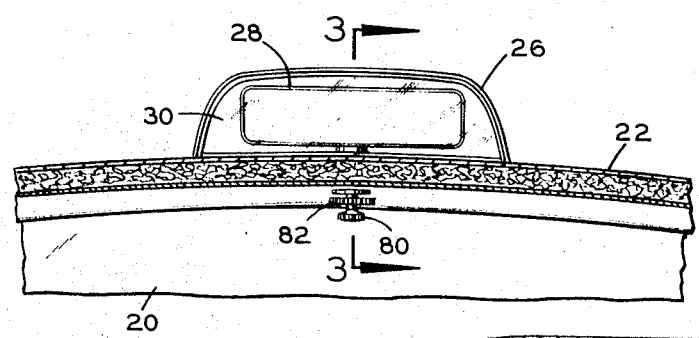
FIG. 2 is a fragmentary sectional view taken along line 2—2 looking in the direction of the arrows.
Figure 3:
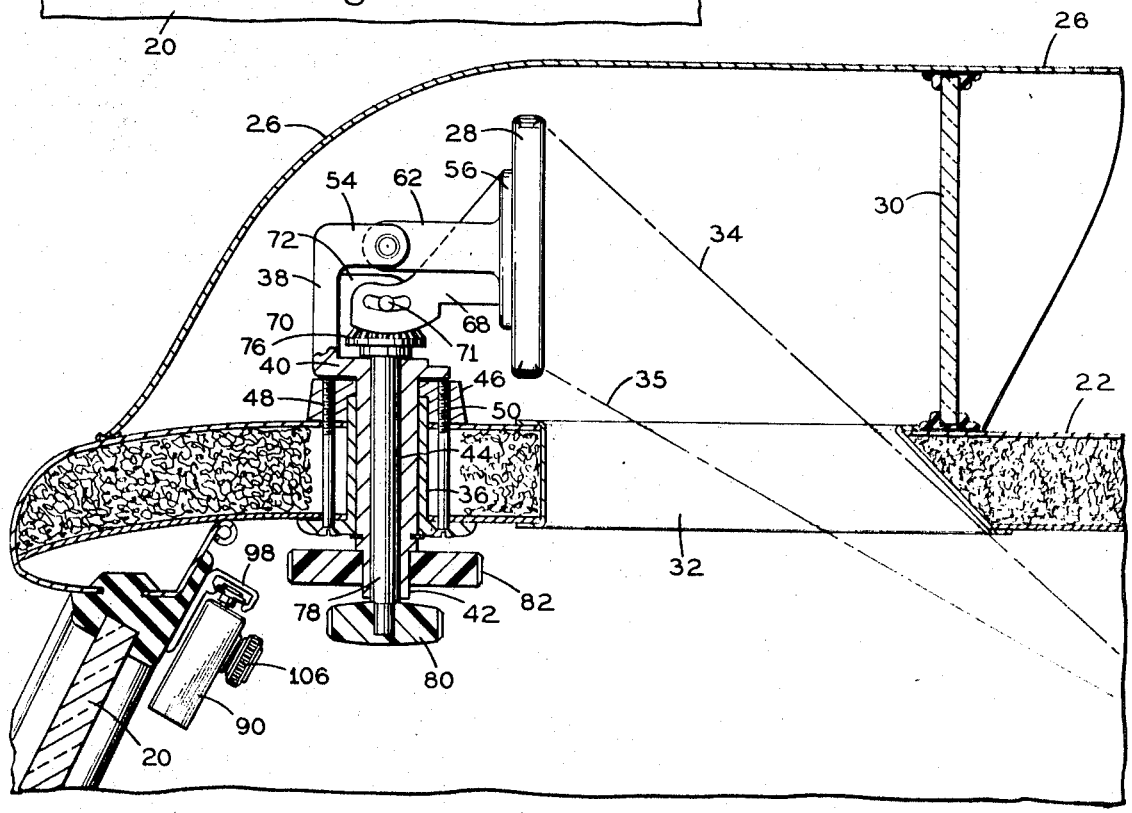
FIG. 3 is a fragmentary sectional view taken along line 3—3 of FIG. 2 looking in the direction of the arrows.

The upper portion of a vehicle body is shown in FIG. 1. The body includes a windshield 20, a roof 22, and a rear window at 24 at the rear end of the roof panel. Mounted on top of the roof panel 22 is a hood 26 in which a rearview mirror 28 is received. The hood 26 is closed at its front end, and has a glass window 30 covering its rear end through which one may view to the rear of the vehicle by means of the mirror 28.

The roof panel 22 has a window aperture 32 formed in it just behind the rearview mirror 28 in a position so that the driver of the vehicle can look into the mirror 28 along a field of view indicated by lines 34, 35. Just ahead of the window aperture 32, there is another aperture 36 through which adjustment controls for the rearview mirror 28 extend.

The mirror 28 is mounted on a bracket 38, the lower end 40 of which is integral with or affixed to the upper end of a hollow shaft 42 which extends downwardly through the aperture 36. The shaft 42 is journaled in a collar 44 which fits in the aperture 36 and is retained in place by a ring 46 and screws 48, 50.

As seen in FIG. 5, the bracket 38 has two upper horizontally extending legs 52 and 54. A plate 56 on which the mirror 28 is fastened as with said screws 58 has two arms 60 and 62 which are pivotally mounted as with pins 64, 66 to the legs 52 and 54 respectively. The pivot pins 64 and 66 allow the plate 56 and mirror 28 to move pivotally in the vertical direction.

Projecting from the plate 56 is another arm 68 which has a slot 70. A pin 71 rides in the slot 70 and is connected to an arm 72 which projects from the bracket 38 below the side legs 52 and 54. The slot 70 allows the arm 68 and mirror 28 to pivot relative to the arm 72.

As shown particularly in FIGS. 6 and 7, the lower side of the arm 68 has gear teeth at 74 which mesh with the teeth of a gear 76 mounted on a second shaft 78 which extends centrally through the hollow shaft 42 down through the roof of the vehicle. Thus, shaft 78 is concentric with shaft 42. The gear 76 need not be a bevelled gear as shown; for example, it could be a worm gear.

Mounted on the end of inner shaft 78 is a control knob 80, and mounted on the lower end of hollow shaft 42 is a control knob 82. Knob 80 may be turned to pivot the mirror 28 in vertical directions in the manner shown in FIG. 7. Knob 82 may be turned to rotate the mirror in horizontal directions as shown in FIG. 8.

If normal sun visors were provided in the vehicle, they might tend to interfere with access to the control knobs 80 and 82. This would be particularly true if the mirror assembly was mounted directly in front of the driver's seat position, but it is also true, although to a lesser extent, if the mirror assembly is mounted at the center of the vehicle. In any event, to avoid any chance of interference between the visors and the mirror assembly, a fanning type of visor assembly is combined with the mirror in accordance with the invention. The visor assembly is shown in FIGS. 9 through 14. The visor includes a housing 90 having wheels 92 and 94 (FIG. 9) secured thereto at its top. The wheels ride in a track 96 formed in a bracket 98 which is secured to the vehicle body just above the windshield as with screws 100, 102. The bracket 98 is wider than the housing 90 and extends almost half the width of the vehicle in front of the driver's position. Thus, the housing 90 can be moved sideways across the driver's side of the windshield, the wheels 92, 94 riding in the track 96. An identical visor housing and visor assembly may be provided at the passenger side of the vehicle.

A rotary shaft 104 extends through and is journaled in the sidewalls of the housing 90 as shown in FIG. 12, and a knob 106 is mounted on the rear end of the shaft 104. The narrow ends of a plurality of fan blades 108 are loosely mounted on the shaft 104 inside the housing 90. The blades 108 may be attached as with rivets to discs 112 which are loosely received on the shaft 104. The rearmost blade 108a is fixed or keyed to the shaft 104 so that it rotates with the shaft. The forwardmost blade 108b is anchored to the housing 90 as with a pin 114 fixed to housing 90 and projecting through an opening in the blade as shown in FIG. 11.

As shown in FIG. 14, each blade has a projection at the wider end thereof, there being one projection 116 on each side of the blade. The projections on one blade are designed to catch on the projections of the next adjoining blade.

Initially the blades are superposed on each other and are all contained within the housing 90 in the manner shown in FIG. 10. When the knob 106 is turned counterclockwise, all of the blades except blade 108b begin to turn. As the blade adjoining blade 108b moves to the leading edge of blade 108b, its projection 116 catches on the leading projection 116 of blade 108b to stop it. Then the third blade catches on the leading projection of the second blade, the fourth blade catches on the leading projection of the third blade, and so on until all of the blades have been spread in the manner shown in FIG. 9. The blades close in the same manner, but projections on the other sides of the blades are operation.

The blades may be opaque or translucent, but in any event they should either block or partially block sun light.

Since the blades fan out in the manner just described, they do not interfere with the controls of the rearview mirror. The mirror can be operated conveniently from inside the vehicle. The concentric arrangement of controls for the mirror conserves space. The mirror can be adjusted without having to reach through the window aperture in the roof of the vehicle.

Having thus described my invention, I claim:

1. A combined rearview mirror and visor system for an automotive vehicle having an upper body including a windshield and a roof panel, said system comprising:
   a rearwardly facing mirror,
   means supporting said mirror above the roof panel adjacent an aperture in the roof panel next to and behind said windshield,
   a first control means for said mirror extending through said roof panel and having a portion available immediately under said roof panel for rotating said support means to turn said mirror generally horizontally, said control means comprising a first shaft affixed to said support for said mirror,
   means mounting said mirror for vertical pivotal movement on said support means,
   second control means for said mirror extending through said roof panel and having a portion available immediately under said roof panel, said second control means comprising a second shaft coupled to said mirror, said second shaft lying concentrically within said first shaft and being operatively connected to said mirror to turn said mirror generally vertically when said second shaft is rotated, and
   a fanning visor mounted at the top of said windshield and having blades which fan out to shade a portion of the windshield.

2. The system as claimed in claim 1 in which said second shaft has a gear connection to said mirror for pivoting the same.

3. The system as claimed in claim 2 in which said visor blades each have a projection at each side edge thereof for causing said blades to fan.

4. The system as claimed in claim 3 in which said blades are superposed and mounted on a shaft at one end thereof, a first blade being fixed to said shaft, a second blade being fixed in a stationary position, and a plurality of blades between said first and second blades being loose relative to said shaft and fanning by operation of said projections upon turning said shaft.

* * * * *